United States Patent Office 3,378,874
Patented Apr. 23, 1968

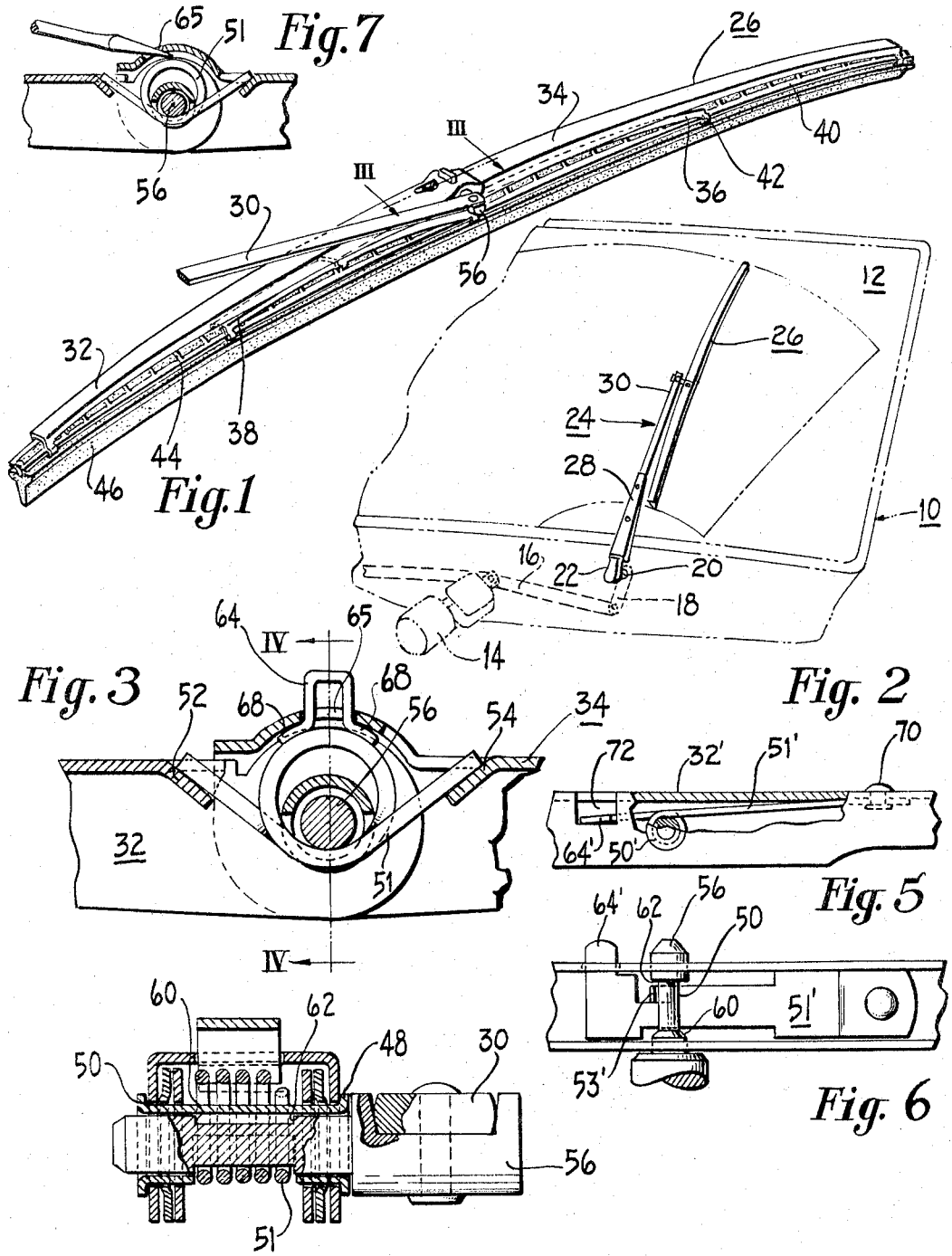

3,378,874
WINDSHIELD WIPER ASSEMBLY
Anthony C. Scinta, Hamburg, N.Y., assignor to Trico Products Corporation, Buffalo, N.Y.
Filed June 10, 1966, Ser. No. 556,716
10 Claims. (Cl. 15—250.32)

The present invention relates to an improved construction for connecting a windshield wiper to a wiper arm.

In accordance with current conventional practice, a clip is pivotally mounted centrally on and straddling the upper surface of the uppermost lever of the superstructure of a windshield wiper blade. This arm receiving clip slidably receives the free end of the wiper arm. Thus, the clip adds to the profile height of the blade and arm combination. With the present drive for increased safety in automotive vehicles, it is desirable for the windshield blade and arm to provide as low a silhouette as possible, thereby reducing the vision obstruction and drive distraction. There is also a trend toward concealing auxiliary equipment for appearance as well as safety purposes in automobile design. To permit the blade to be concealed in the parked position, it is necessary to provide a low silhouette arm and blade combination which can pass through a small slot in the cowl of the vehicle.

The present invention contemplates a side mounted arm utilizing the superstructure itself as the housing for the arm receptor or connector. Such arragements have been previously suggested. However, in the prior art devices the side mounted arms created certain problems. For example, the blade in the prior art devices is not readily detachable from the arm and in some of these cases it is not possible to pivot the blade about a transverse axis without complex and relatively expensive additional structure.

It is therefore the principal object of the present invention to provide a readily detachable, firmly latched side mounted arm and blade assembly.

Another object of the invention is to provide an improved, simple, economical, side mounted arm and blade assembly utilizing the superstructure as the chamber for receiving the connecting elements.

A further object of the invention is to provide an improved side mounted arm and blade assembly wherein existing elements of a conventional wiper blade are utilized for providing receptor and latching structure.

A further object of the invention is to provide an improved side mounted wiper arm and blade assembly wherein the connecting elements are readily detachable from each other and from a reinforced pivotal axis with improved distribution of forces to prevent excessive layover as the wiper blade traverses back and forth across the wiping path.

Other objects and advatages of the invention will be apparent from the following detailed description taken in connection with the accompanying drawings in which:

FIG. 1 is a perspective view of the arm and blade assembly of this invention;

FIG. 2 is a fragmentary perspective view of a motor vehicle showing one embodiment of the improved wiper arm and blade assembly of the present invention;

FIG. 3 is a sectional view taken on line III—III of FIG. 1;

FIG. 4 is a sectional view taken on line IV—IV of FIG. 3;

FIG. 5 is a fragmentary side elevational view partly in section of a modified embodiment of the invention;

FIG. 6 is a fragmentary bottom elevational view illustrating the embodiment of FIG. 5; and FIG. 7 is a fragmentary sectional view similar to FIG. 3 showing a preferred modification of the invention.

Briefly, the invention comprises a wiper arm and blade assembly wherein the uppermost lever structure of the superstructure has transverse blade connection receptor means extending therethrough substantially centrally of the blade and lying within the confines of the profile of the arm superstructure. The wiper arm includes a connecting pin at the free end thereof extending at an angle and preferably at substantailly right angles to the arm. The pin is received in the receptor on the wiper blade superstructure; releasable latching means are provided for retaining the pin in the receptor. Externally accessible unlatching means are provided for manual disengagement of the blade from the arm. The pin is insertable in the receptor by movement of the blade in a direction transverse to the longitudinal axis of the arm. The blade is mounted for unrestrained rotation about an axis transverse to the longitudinal axis of the arm at the connecting pin.

In one embodiment of the invention, shown best in FIGS. 1, 3 and 4, as well as the embodiment of FIG. 7, a blade of the type having a pair of channel-shaped levers pivoted together centrally of the blade and biased by a coil spring to conform the contour of a windshield is utilized. Transverse blade connection receptor means comprising tubular means are provided to secure the levers together and to provide a pivotal axis for relative movement between the levers. The coil spring is located in substantial alignment, but biased eccentric to the tubular means; the arm connecting pin has a reduced diameter portion intermediate its ends forming a pair of annular opposing shoulders which latchingly engage the coil spring and are retained within the tubular receptor means by the spring due to the eccentric disposition of the spring. Access to the spring is provided from the exterior of the superstructure to permit pressing the spring against its bias into concentricity with the receptor means. This permits disengagement of the spring and the pin, permitting removal of the blade from the arm by movement transverse to the longitudinal axis of the arm. Manual push button means may be provided to assist in disengaging the latch. Alternatively, a tool may be inserted in an access opening to effect disengagement.

In another modification, transverse receptor means comprising a pair of aligned openings in the legs of a channel-shaped lever member are provided transverse to the longitudinal axis of the blade and a similar pin having opposed shoulders is receivable in the transverse receptor. A leaf spring type latch is fulcrumed at a point spaced from the connecting means and is biased into position for engagement with the opposing shoulders at the pin. At its free end an extension external to the superstructure is provided for manual movement of the leaf spring to permit removal of the blade. It can thus be seen that the connecting pin not only provides a connecting means, but also forms a pivotal axis for pivoting the blade relative to the arm and a reinforcing cylindrical structure at the pivot for preventing excess lateral rotation of the blade as it traverses its path.

In FIG. 2 an automotive vehicle 10 is shown having a windshield 12 mounted thereon in the conventional manner. Suitably mounted underneath the cowl or on the fire wall of the vehicle is a wiper motor 14. Links 16 have one end thereof suitably connected for driving engagement by motor 14 and the other ends thereof suitably pinned to the outer ends of crank arms 18 which are fixedly mounted on rockshafts 20 which, in turn, are journaled for rotation in the cowl of the vehicle. The rockshafts 20 receive mounting head portion 22 of wiper arm 24 which mount wipers 26 at the outer ends thereof. As is well known in the art, when the wiper motor 14 is placed in operation, wipers 26 will be caused to oscillate back and forth across the windshield to remove moisture therefrom. Wiper arm 24 may be of any suitable construction. By way of example, an arm is illustrated which includes mounting head portion 22 to which is pivotally attached the spring chamber 28. A biasing means, not shown, anchored at each end, extends between spring chamber 28 and the mounting head portion 22. The outer end of spring chamber 28 mounts bar stock member 30.

Although in accordance with the broader aspects of the invention any suitable type of wiper blade may be utilized in the assembly of the present invention, by way of example, the blade 26 shown in FIGS. 1 and 3 comprises a pair of channeled levers 32 and 34 pivoted together at adjacent ends centrally of the blade. A lever 36 is pivoted intermediate its end at the pivot point between levers 32 and 34 and is pivotally connected at one end to a yoke 38. At its other end, lever 36 is slidably engaged to a backing strip 40 by claws 42. The yoke 38 is slidably connected at each end to the backing strip 40. The backing strip 40 comprises a pair of longitudinal side rails secured together by bridges 44. The side rails are received in longitudinal grooves on opposite sides of the rubber element 46.

The levers 32, 34 and 36 may be secured together by a tubular cylindrical member 48 extending transversely through openings 50 in the side walls of the U-shaped levers as shown in FIG. 4. The tubular member 48 may be flanged at its outer ends to maintain the structure in assembled relationship. A coil spring 51 circumscribes the tubular member and has its free ends engaging struck-out portions 52 and 54 of levers 32 and 34, respectively, for distributing pressure through the levers to the ends of the blade. The tubular member 48 has a portion of its side wall cut away for the length of the coil spring 51. The coil spring is biased with its axis eccentric to the axis of the tubular member 48 due to the engagement of its free ends with struck-out portions 52 and 54. Instead of utilizing a single tubular member 48, a pair of tubular members on the same axis may be utilized to connect each leg of the U-shaped levers together. In this case, the coil spring extends between the pair of tubular members.

The wiper arm 24 has at the free end of bar stock member 30 rigidly secured thereto a pin 56 as, for example, by riveting as shown, of by welding, or in any other suitable or desirable manner. The pin 56 has a central reduced diameter portion 58 which extends lengthwise a distance slightly greater than the length of the coil spring 51 and forms a pair of opposing shoulders 60 and 62. The arm and blade assembly is connected together by inserting the pin 56 transversely through the tubular member 48 or its equivalent whereupon the spring is biased to a position whereby it is disposed for engagement with the shoulders 60 and 62 to prevent transverse movement of the pin 56. The pin 56 and the coil spring 51 thereby form a latch for retaining the arm and blade assembly in assembled condition. The pin 56 further provides a pivotal axis for rotational movement of the blade relative to the arm. The tubular structure 48 or its equivalent forms a bearing for the pin 56. The pin 56 further provides reinforcement for the hollow tubular structure 48 or its equivalent. Thus the hollow tubular structure 48 constitutes transverse receptor means for the pin 56 as well as bearing means. An opening 65 in the web of the channel-shaped superstructure levers 32 and 34 is provided to give access to the spring 51 whereby it may be manually depressed toward a concentric position relative to the receptor means 48 to permit disassembly of the arm from the blade.

A manual push button 64 having at its ends semicircular formations 66 and 68 engageable with the periphery of the spring 51 may be provided for assisting in manually depressing the spring to disengage the arm and blade. Alternatively, a leverage tool 67 may be utilized to depress the spring 51 through opening 65 as shown in FIG. 7.

A modified embodiment of the invention is illustrated in FIGS. 5 and 6. Certain parts of this modification are similar to the FIGS. 3 and 4 modifications. Identical parts will be identified by identical reference numerals and corresponding parts will be identified by corresponding primed reference numerals. Only that portion of the structure which is different from the FIG. 1 embodiment will be described in detail.

A fragmentary illustration of the blade superstructure is shown in FIGS. 5 and 6. It includes preferably a channel-shaped lever member 32' which may be a part of any suitable type blade superstructure. Aligned openings 50' extend through the legs of the lever member at a position centrally on the blade. A leaf spring 51' is provided and is secured by riveting as at 70 or in any other suitable manner to the top wall or web portion of the lever member 32' at a point longitudinally spaced from the openings 50'. The leaf spring 51' includes a struck-out tab 53'. The lever extends and overhangs the openings 50' and has a lateral extension 64' which extends through a notched out portion 72 in the leg or side wall of the lever member 32'. The arm, not shown in FIGS. 5 and 6, includes a pin 56 identical to the pin 56 shown in FIGS. 3 and 4. Its shoulders 60 and 62 are spaced apart a distance slightly greater than the width of the leaf spring 51'. The pin 56 may be inserted through the openings 50' in the side walls of the lever 32' whereupon the leaf tab 53' and side edges of spring 51' are biased to a position for engagement with the shoulders 60 and 62 of the pin 56 to retain the arm and blade in assembled relationship. The lateral extending portion 64' is externally accessible and may be manually operated to move the leaf spring 51' to a portion for permitting removal of the blade 26. The blade may then be removed by transverse movement from the arm. Thus the pin 56 forms a connector element, as well as a solid pivot journaled in aligned openings 50' which form a transverse receptor.

It should now be apparent that a unique wiper arm and blade assembly has been provided which includes a novel arm to blade connector for a side mounted blade which is readily releasable and serves a multifold purpose in that the connection forms a releasable latch, an arm to blade transverse pivotal connection and reinforcement for the pivotal connection. The improved arm and blade assembly is simple in construction, utilizes existing elements and provides a low profile arm and blade assembly for increased vision; it also makes possible improved appearance as, for example, by enabling the use of concealed wiper arms and blades.

Certain specific embodiments of the invention have been described for the purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. A side mounted low silhouette windshield wiper blade and arm assembly comprising a pressure distributing blade superstructure having a transverse receptor disposed within the blade silhouette and a wiper arm having a cantilever mounting pin substantially at its outer end extending at an angle to the longitudinal axis of said arm, said transverse receptor having an opening at its end for receiving said pin at a point lower than the upper surface of the blade by a transversely directed thrust of said blade relative to said arm whereby said arm may lie in a plane intermediate the wiping edge of the blade and the upper assembly thereof and means for releasably interlocking said cantilever pin and said transverse receptor, said cantilever pin forming a rotational axis for said blade.

2. A side mounted windshield wiper blade and arm assembly according to claim 1 wherein said means for releasably interlocking said cantilever pin and said receptor includes a coil spring normally biased eccentrically with respect to said transverse receptor and said cantilever pin being concentric with said transverse receptor, said pin including annular shoulder means engageable with the ends of said coil spring when the coil spring is in its eccentric position.

3. A side mounted windshield wiper blade and arm assembly according to claim 2 including access means for permitting manual displacement of said coil spring to effect release of said cantilever pin from said transverse receptor whereby the blade can be removed from the arm by movement transverse to the longitudinal axis of the arm.

4. A side mounted windshield wiper blade and arm assembly according to claim 3 including externally operable means disposed in said access means for displacing said coil spring to permit release of said cantilever pin from said transverse receptor.

5. A side mounted windshield wiper blade and arm assembly according to claim 4 wherein said externally operable means includes a push button in operative engagement with said coil spring to effect displacement thereof when said push button is depressed whereby said cantilever pin may be released from said transverse receptor.

6. A side mounted windshield wiper blade and arm assembly according to claim 1 wherein said means for releasably interlocking said cantilever pin and said receptor includes a leaf spring fulcrumed adjacent one end and extending from said fulcrumed end beyond said transverse receptor, said pin including opposed annular shoulders, said leaf spring having a section thereof biased to a position lying between said annular shoulders.

7. The combination of claim 6 including an externally accessible section on said leaf spring for effecting manual release of said pin from said transverse receptor.

8. A side mountable windshield wiper blade assembly comprising a pressure distributing blade superstructure having a transverse receptor centrally disposed within the superstructure silhouette, said receptor having an opening at its end for receiving an arm connecting cantilever pin by a transversely directed thrust of said blade relative to an arm and releasable latching means disposed at said transverse receptor for rotatably interlocking the blade assembly and the pin.

9. A side mounted windshield wiper blade and arm assembly comprising a wiper blade including a pressure distributing superstructure, said superstructure including a plurality of channel-shaped lever members, aligned open center securing means extending transversely through the legs of said lever members for pivotally securing said lever members together substantially centrally of the length of said blade, a coil spring disposed at said open center securing means having its free ends bearing on the web of adjacent channel-shaped lever members for distributing applied pressure, said coil spring being biased to an eccentrically disposed position with respect to the axis of the open center securing means, a wiper arm having a cantilever pin at its free end extending at an angle to the longitudinal axis of the arm, said pin being of reduced diameter intermediate its ends thereby forming a pair of opposed shoulders, said coil spring and said open center securing means forming a releasable latching receptor for said pin, said pin being receivable in said receptor with said coil spring being engageable with said shoulders, said pin in assembled position forming a transverse pivot for said wiper blade.

10. A windshield wiper blade and arm assembly comprising a wiper blade including a pressure distributing superstructure, said superstructure including a plurality of lever members, at least one of which includes a channel-shaped section, open center securing means having an axis extending transversely through said channel-shaped section, a leaf spring overhanging and intersecting a portion of said open center securing means, a wiper arm having a cantilever pin at its free end extending at an angle to the longitudinal axis of the arm, said pin being of reduced diameter intermediate its ends thereby forming a pair of opposed shoulders, said leaf spring and said open center securing means forming a releasable latching receptor for said cantilever pin, said cantilever pin being receivable in said receptor with said leaf spring being engageable with said shoulders, said cantilever pin in assembled position forming a transverse pivot within the silhouette of said lever for said wiper blade.

References Cited

UNITED STATES PATENTS

| | | | |
|---|---|---|---|
| 2,560,780 | 7/1951 | Sacchini | 15—250.32 X |
| 2,616,112 | 11/1952 | Smulski | 15—250.32 |
| 3,139,645 | 7/1964 | Scinta | 15—250.32 |

FOREIGN PATENTS

| | | |
|---|---|---|
| 1,069,875 | 2/1954 | France. |

CHARLES A. WILLMUTH, *Primary Examiner.*